Figure 2:
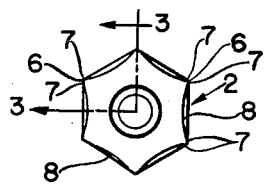

July 20, 1965  A. W. JACOBS  3,195,933
GLAND TYPE COUPLING FOR TUBES
Filed Oct. 27, 1960

INVENTOR.
ARTHUR W. JACOBS
BY
Oberlin, Maky & Donnelly
ATTORNEYS

3,195,933
GLAND TYPE COUPLING FOR TUBES
Arthur W. Jacobs, 5994 Columbia Road,
North Olmsted, Ohio
Filed Oct. 27, 1960, Ser. No. 65,330
1 Claim. (Cl. 285—247)

The present invention relates generally as indicated to a gland type coupling for tubes and, more particularly, to improvements in a nylon coupling of the type disclosed in my Patent No. 2,755,110 dated July 17, 1956 to enable fluid tight and secure clamping of polyethylene or like elastomeric tubes without prior flaring, beading, or like enlargement thereof.

At the present time there in an increasing use of polyethylene tubing in various fluid systems owing to its flexibility, very low water absorption, and good resistance to attack by acids, alkalies, and organic solvents. However, with ordinary flareless tube couplings there is some tendency of polyethylene, and other flexible plastics, as well, to cold flow under sustained pressure when joined to a tube coupling assembly, whereby an initial seal between the tube and coupling parts may leak in due course. In addition, such tube may collapse under vacuum out of sealing engagement with the tube coupling parts. Moreover, in installations involving severe tube flexing, there may be pulling away of the polyethylene or like tube from the sealing zones.

Accordingly, it is a principal object of the present invention to provide a flareless tube coupling in which a contractible ferrule or ring portion thereof is pressed axially against a cam surface of the coupling body to bite into the surface of the polyethylene or like tube, and to force the tube end axially into an annular wedge-shaped space of said body which supports the interior of the tube and which establishes and maintains a fluid-tight connection against internal pressure or vacuum and despite cold flow and severe flexing of the tube.

Another object of this invention is to provide a flareless tube coupling in which, despite the fact that it comprises only a one-piece body and a one-piece nut having threaded engagement with each other, the make-up of the coupling-tube joint does not entail torquing of the tube.

Another object of this invention is to provide a two-piece coupling which is fabricated entirely from nylon to provide the features mentioned heretofore, and, in addition, to provide good vibration-resistance; chemical inertness with reference to acids, alkalies, hydrocarbons, lacquer solvents, refrigerants; and thermal shock resistance. Moreover, the coupling parts when fabricated of nylon, do not become brittle even at temperatures of minus 70° F. and are form-stable even at temperatures above 400° F. Another desirable characteristic is that no lubrication or coating of threads of the nylon coupling parts is required in order to prevent seizing or galling. Yet another important characteristic is that because of the fluidity of the nylon during molding, the injection molded coupling parts may be made with thin sections where required, and with sharp corners without any machining whatsoever thereby effecting substantial economies in cost while providing a superior coupling.

Another object of this invention is to provide a tube coupling in which the deformable ferrule or ring is elastically deformable so that the same may be reused any number of times.

Another object of this invention is to provide a tube coupling in which the elastically deformable ferrule or ring portion thereof is integrally formed with one of the threaded-together coupling parts for bodily contraction about its anchored end to effect gripping of an extended portion of the tube with a gradually relaxing pressure to further enhance the vibration-resisting characteristics of the coupling in connection with soft metal or plastic tubes.

Another object of this invention is to provide a tube coupling of the character indicated which is provided with positive stop or signal means to prevent over-tightening and possible damage to the coupling parts, or to the tube gripped thereby.

Yet another object of this invention is to provide a tube coupling for polyethylene and like tube in which the nut and body members may be screwed together simply by finger pressure while yet achieving firm and fluid-tight griping of the tube therebetween.

Yet another object of this invention is to provide a tube coupling of the character indicated in which polyethylene and like tubes are securely gripped but without appreciable constriction of the flow passage through the tube and coupling assembly.

Other objects and advantages of the present invention will become apparent as the following description proceeds.

Figure 1:
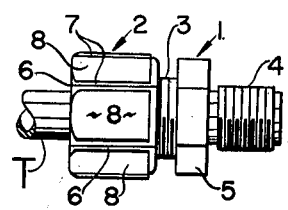
Figure 3:
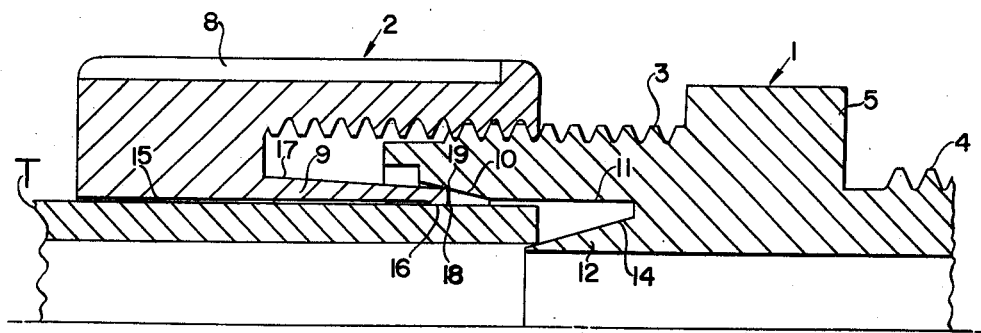
Figure 4:
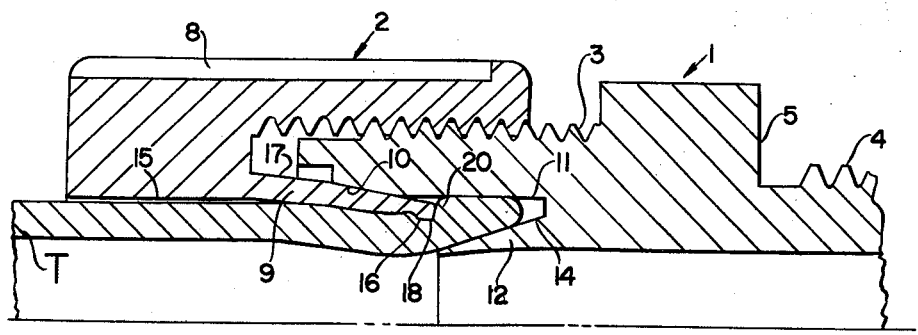
Figure 5:
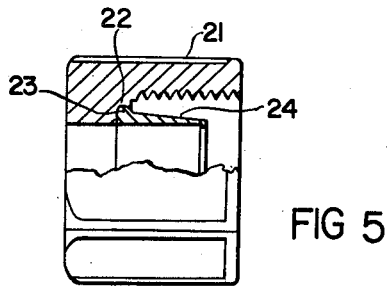

In said annexed drawings:
FIG. 1 is a side elevation view of a tube coupling assembly in accordance with the present invention;
FIG. 2 is an end elevation view as viewed from the left-hand side of FIG. 1;
FIG. 3 is a much enlarged radial cross-section view of the tube coupling assembly herein in the condition which the parts assume when the nut is screwed in to just engage its ferrule portion with the flare mouth of the body part;
FIG. 4 is a similar enlarged radial cross-section view showing the coupling assembly in its normal finger-tight assembled condition; and
FIG. 5 is a side elevation view partly in cross-section showing a modified form of nut in which the ferrule is rotatably connected to the nut.

Referring now to the drawing, and first to FIGS. 1 and 2 thereof, the coupling body part 1 has a nut 2 screwed thereonto to form a cavity for receiving the end portion of a polyethylene or like tube T. In the present case, by way of example only, the body 1 is a straight coupling which is threaded as at 3 for the nut 2 and as at 4 for screwing into an internally threaded boss of a pump housing, motor housing, valve body, pressure gage, or other fluid system component. Between the threaded end portions of the body 1 is the usual wrench-engaging portion 5. Obviously, the body 1 may be an elbow T, cross, or other shape instead of the straight coupling herein shown.

The nut 2 herein shown is of generally hexagonal form providing relatively sharp corners 6 and adjacent, narrow flats 7 for engagement as with a wrench. However, between the respective flats 7, each side is of concavely curved form as represented by reference numeral 8, it having been discovered that by so shaping the sides of the nut 2 it may be readily grasped as between the thumb and second knuckle of the first finger to apply torque on the nut which is of magnitude substantially greater than the finger torque that could be applied on a plain hex nut of the same size. In the case of a 13/16" hex the flats 7 may be about .050" and the curvature of the surfaces 8 is such that the radial depth at the middle of each is about .030" from the plane of the flats 7.

Now, with respect to the details of the tube coupling herein, FIG. 3 shows the nut 2 and body 1 screwed together until the integral tapered ferrule portion 9 of the nut 2 just engages the complementary tapered flare mouth 10 of the body 1. Also, FIG. 3 shows the tube T inserted through the nut 2 with its axially inner end portion centered by bore 11 and the tapered nose or lip 12. The tapered nose or lip 12 of the body 1 tapers to substantially a sharp edge (0.10" or less flat) which is of diameter just a few thousandths of an inch less than the inside diameter of the tube T, whereby the inner edge of the tube T will engage the outer conical surface 14 of said nose 12. Surrounding the nose 12 is the cylindrical bore 11 which is of diameter just a few thousandths of an inch larger than the outside diameter of the tube T. The bore portion 11 is of greater axial length than the nose 12 to receive and to center the tube end and together the bore 11 and surface 14 define an annular wedge-shaped cavity therebetween. For best results, the apex angle of the conical surface 14 should be about 30° but apex angles from about 20° to 40° will be found generally satisfactory. On the other hand, the apex angle of the flare mouth 10 is preferably about 22° although apex angles from about 15° to 30° will provide the necessary camming action on the ferrule portion 9.

The ferrule portion 9 is formed with a bore portion 15 that is of uniform diameter just a few thousandths of an inch larger than the outside diameter of the tube T and the end portion of the ferrule 9 has an annular flange 16 extending radially inwardly therefrom, the diameter of which is about .010″ less than the tube diameter and for a length of about 1/32″ in the case of a nut 2 for 3/8″ diameter tube. The ferrule 9 has an outer tapered surface 17 (preferable apex angle of 4° but variable up to about 12°) and terminates in a plane annular end face of about .025″ to .030″ radial width for a 3/8″ tube coupling assembly. The inner corner 18 is sharp to bite into the tube T and the outer corner 19 has a small radius to prevent gouging of the flare mouth 10.

As soon as the nut 2 is turned from the FIG. 3 position, the sharp corner 18 of the ferrule 9 will immediately bite into the outer surface of the tube T to plow up a ridge 20 which becomes progressively deeper and through which the tube T will be positively forced axially in unison with the axial advance of the nut 2. Such axial advance of the tube T causes the inner end portion thereof to be wedged firmly between the tapered nose 12 and the bore 11 as shown in FIG. 4. The frictional grip of the ferrule 9 along a substantial length of the tube T axially outward of the ridge 20 precludes pull strains on the tube T from imposing additional load on the holding and sealing ridge 20. Moreover, because of the wedging of the axially inner end portion of the tube T as aforesaid, cold flow and displacement (as by tube flexing) of the tube T cannot occur and therefore a vacuum and pressure tight seal is retained indefinitely.

In the event that the nut 2 is tightened with a wrench, instead of by the fingers as contemplated, it can be seen that the nut 2 may be turned only another part turn beyond the position of FIG. 4, since, in that case, the tube end will substantially fill the wedge-shaped space between bore 11 and nose 12 to provide a marked increase in nut torque which serves as a sensory signal that the coupling nut 2 has been sufficiently tightened.

The preferred nylon which is used in the making of the body 1 and nut 2 is known as injection molding material Type 6 or Type 6/6 which is characterized by its relatively great hardness of Rockwell R–118; tensile strength of 11 to 12,000 p.s.i.; elongation 90% or more; modulus of elasticity up to about 400,000 p.s.i.; flexural strength up to 16,000 p.s.i.; and impact strength (IZOD) of at least about 1.0 ft./lb. per inch of notch. In the present case, the nylon ferrule portion 9 is elastically deformable and when the nut 2 is unscrewed it will return substantially to its original form as shown in FIG. 3.

Another feature of the coupling herein when made of nylon, is that the coupling nut 2 and body 1 are self-locking due to resilience of these parts and to the large difference between the static and dynamic coefficients of friction of nylon on nylon.

The nylon from which these coupling parts 1 and 2 are injection molded may be described as a "horny" material which is strong and hard but yet is resilient, so as to make it the only known material suitable for a flareless tube coupling of the character described. The self-locking characteristics are important in resisting loosening by vibration. The nylon parts have good vibration-resisting qualities. Moreover, the nylon parts have adequate strength and do not cold flow under pressure and since the elastomeric tube T herein is confined in a wedge-shaped space from which it cannot cold flow, a fluid-tight and firm grasp on the tube T is assured despite the fact that the tube itself is very flexible and weak structurally.

An important feature of this invention is that in the tightening of the nut 2 there may initially be a very slight tendency of turning the tube T during say, about the first half turn of the nut 2 from the FIG. 3 position, but, thereafter, the tube T even if left free, does not tend to turn at all. This is apparently due to the expansion of the tube by nose 12 so that the tube is in frictional contact with bore 11 and with the surface 14 of nose 12. Thus, the wall of the tube T is wedged between bore 11 and nose 12 to provide a greater resistance to tube turning than imposed by the turning of the ferrule 9 on the tube T. Even firmer holding of the tube T against turning may be achieved by draw filing the die surfaces corresponding to surface 14 and/or bore 11 whereby these molded surfaces will be of frosted or etched nature for increasing the coefficient of friction with the tube T.

However, if desired, the nut 21 may be formed with a relatively shallow internal groove 22 into which the peripheral bead 23 of a separate ferrule 24 is snapped, as shown in FIG. 5. With such two-piece nut 21 and ferrule 24 even the slight initial turning of the tube T as above explained will be eliminated.

Yet another important feature of this invention is that in the assembled condition there is only a slight reduction in the flow area of the passageway through the tube T and body 1 as caused by yielding of the nose 12 as in FIG. 5.

There are, in the present coupling four areas of sealing viz, between the tube T and surface 14, between the tube T and the bore 11, between the ferrule 9 and the flare mouth 10, and between the ferrule 9 and the tube T.

Other modes of applying the principle of the invention may be employed, change being made as regards the details described, provided the features stated in the following claim, or the equivalent of such, be employed.

I therefore particularly point out and distinctly claim as my invention:

A flareless tube coupling assembly for a rubber-like flexible tube comprising a body formed with a tube-end receiving cavity defined by a bore one wall of which defines a flare mouth surrounding the inserted tube, a length of rubber-like flexible tube having an end inserted in said cavity, said body having an annular wedge-shaped lip disposed axially inwardly adjacent the inserted end of the tube, a cylindrical outer wall radially spaced above said lip and of approximately the same diameter as the tube and the radially outer wall of said lip being frusto-conical and of such a diameter at its small end to fit within the inserted tube end, the distance between said lip and said cylindrical wall being dimensioned to radially squeeze the tube wall upon axial advance of the tube end thereinto; a ferrule surrounding the tube the internal diameter of which is slightly larger than the external diameter of the tube, a radially inwardly extending flange on the inner end of said ferrule of an axial length less than that of the wall defining said flare mouth, said inner end of said ferrule confronting such flare mouth wall for contraction thereby into tube-gripping engagement upon axial advance of said ferrule; and a nut integral with said ferrule and in threaded engagement with said body operative, when turned, first to axially advance said ferrule to cause contraction of said inner end by such flare mouth into tube gripping engagement and thereafter to continue axial advance of said ferrule and tube whereby the latter is wedged between said lip and said cylindrical wall to establish a fluid tight seal between said body and tube and to hold said tube against turning despite turning of said ferrule by said nut, at least one of the surfaces of said cylindrical wall and said lip being roughened to increase the frictional resistance to turning of the tube during tightening of said nut.

References Cited by the Examiner

UNITED STATES PATENTS

| | | | |
|---|---|---|---|
| 1,348,667 | 8/20 | Snyder | 285—328 |
| 1,506,564 | 8/24 | Cattoni | 285—39 |
| 2,152,537 | 3/39 | Couty | 285—342 |
| 2,755,110 | 7/56 | Jacobs. | |
| 2,807,481 | 9/57 | Main | 285—382.7 |
| 2,850,303 | 9/58 | Bauer | 285—342 |
| 2,874,981 | 2/54 | Brady | 285—328 X |
| 2,951,715 | 9/60 | Baller | 285—249 |

FOREIGN PATENTS

| | | |
|---|---|---|
| 14,397 | 1890 | Great Britain. |
| 660,363 | 2/29 | France. |

CARL W. TOMLIN, *Primary Examiner.*